US011849042B2

(12) United States Patent
Verstraeten et al.

(10) Patent No.: US 11,849,042 B2
(45) Date of Patent: Dec. 19, 2023

(54) VIRTUAL ACCESS CREDENTIAL INTERACTION SYSTEM AND METHOD

(71) Applicant: Visa International Service Association, San Francisco, CA (US)

(72) Inventors: Gilles Verstraeten, San Francisco, CA (US); Pedro Sousa, San Francisco, CA (US); Mark Pettit, San Francisco, CA (US); Prarthana Mitra, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/432,231

(22) PCT Filed: May 17, 2019

(86) PCT No.: PCT/US2019/032851
§ 371 (c)(1),
(2) Date: Aug. 19, 2021

(87) PCT Pub. No.: WO2020/236135
PCT Pub. Date: Nov. 26, 2020

(65) Prior Publication Data
US 2022/0103360 A1    Mar. 31, 2022

(51) Int. Cl.
*H04L 9/32* (2006.01)
*G06Q 20/38* (2012.01)
*G06Q 20/40* (2012.01)

(52) U.S. Cl.
CPC ....... *H04L 9/3213* (2013.01); *G06Q 20/3821* (2013.01); *G06Q 20/40* (2013.01); *H04L 9/3263* (2013.01); *H04L 9/3273* (2013.01)

(58) Field of Classification Search
None
See application file for complete search history.

(56) References Cited

U.S. PATENT DOCUMENTS 5,280,527 A    1/1994  Gullman
5,613,012 A    3/1997  Hoffman
(Continued)

FOREIGN PATENT DOCUMENTS

EP    1028401 A2    8/2000
EP    2156397 A1    2/2010
(Continued)

OTHER PUBLICATIONS

PCT/US2019/032851, "International Search Report and Written Opinion", dated Feb. 14, 2020, 9 pages.
(Continued)

*Primary Examiner* — Kito R Robinson
*Assistant Examiner* — Shacole C Tibljas
(74) *Attorney, Agent, or Firm* — Kilpatrick Townsend & Stockton LLP

(57) ABSTRACT

A method includes an authorizing entity computer receiving a request for a virtual access credential from a communication device operated by a user. The authorizing entity computer can then transmit the virtual access credential to the communication device operated by the user. The authorizing entity computer can then receive an authorization request message comprising the virtual access credential from an access device associated with a resource provider for an interaction between the user and the resource provider. The authorizing entity computer can then determine an account identifier linked to the virtual access credential. The account identifier being associated with an account maintained by an external entity computer that is external to the authorizing entity computer. The authorizing entity computer can then determine that the interaction is authorized based upon determining the account identifier associated with the virtual access credential.

20 Claims, 6 Drawing Sheets

(56) References Cited

U.S. PATENT DOCUMENTS

| | | | |
|---|---|---|---|
| 5,781,438 | A | 7/1998 | Lee |
| 5,883,810 | A | 3/1999 | Franklin |
| 5,930,767 | A | 7/1999 | Reber |
| 5,953,710 | A | 9/1999 | Fleming |
| 5,956,699 | A | 9/1999 | Wong |
| 6,000,832 | A | 12/1999 | Franklin |
| 6,014,635 | A | 1/2000 | Harris |
| 6,044,360 | A | 3/2000 | Picciallo |
| 6,163,771 | A | 12/2000 | Walker |
| 6,227,447 | B1 | 5/2001 | Campisano |
| 6,236,981 | B1 | 5/2001 | Hill |
| 6,267,292 | B1 | 7/2001 | Walker |
| 6,327,578 | B1 | 12/2001 | Linehan |
| 6,341,724 | B2 | 1/2002 | Campisano |
| 6,385,596 | B1 | 5/2002 | Wiser |
| 6,422,462 | B1 | 7/2002 | Cohen |
| 6,425,523 | B1 | 7/2002 | Shem Ur |
| 6,453,301 | B1 | 9/2002 | Niwa |
| 6,592,044 | B1 | 7/2003 | Wong |
| 6,636,833 | B1 | 10/2003 | Flitcroft |
| 6,748,367 | B1 | 6/2004 | Lee |
| 6,805,287 | B2 | 10/2004 | Bishop |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,980,670 | B1 | 12/2005 | Hoffman |
| 6,990,470 | B2 | 1/2006 | Hogan |
| 6,991,157 | B2 | 1/2006 | Bishop |
| 7,051,929 | B2 | 5/2006 | Li |
| 7,069,249 | B2 | 6/2006 | Stolfo |
| 7,103,576 | B2 | 9/2006 | Mann, III |
| 7,113,930 | B2 | 9/2006 | Eccles |
| 7,136,835 | B1 | 11/2006 | Flitcroft |
| 7,177,835 | B1 | 2/2007 | Walker |
| 7,177,848 | B2 | 2/2007 | Hogan |
| 7,194,437 | B1 | 3/2007 | Britto |
| 7,209,561 | B1 | 4/2007 | Shankar et al. |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 | 4/2008 | Labrou |
| 7,379,919 | B2 | 5/2008 | Hogan |
| RE40,444 | E | 7/2008 | Linehan |
| 7,415,443 | B2 | 8/2008 | Hobson |
| 7,444,676 | B1 | 10/2008 | Asghari-Kamrani |
| 7,469,151 | B2 | 12/2008 | Khan |
| 7,548,889 | B2 | 6/2009 | Bhambri |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,650,314 | B1 | 1/2010 | Saunders |
| 7,685,037 | B2 | 3/2010 | Reiners |
| 7,702,578 | B2 | 4/2010 | Fung |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II |
| 7,784,685 | B1 | 8/2010 | Hopkins, III |
| 7,793,851 | B2 | 9/2010 | Mullen |
| 7,801,826 | B2 | 9/2010 | Labrou |
| 7,805,376 | B2 | 9/2010 | Smith |
| 7,805,378 | B2 | 9/2010 | Berardi |
| 7,818,264 | B2 | 10/2010 | Hammad |
| 7,828,220 | B2 | 11/2010 | Mullen |
| 7,835,960 | B2 | 11/2010 | Breck |
| 7,841,523 | B2 | 11/2010 | Oder, II |
| 7,841,539 | B2 | 11/2010 | Hewton |
| 7,844,550 | B2 | 11/2010 | Walker |
| 7,848,980 | B2 | 12/2010 | Carlson |
| 7,849,020 | B2 | 12/2010 | Johnson |
| 7,853,529 | B1 | 12/2010 | Walker |
| 7,853,995 | B2 | 12/2010 | Chow |
| 7,865,414 | B2 | 1/2011 | Fung |
| 7,873,579 | B2 | 1/2011 | Hobson |
| 7,873,580 | B2 | 1/2011 | Hobson |
| 7,890,393 | B2 | 2/2011 | Talbert |
| 7,891,563 | B2 | 2/2011 | Oder, II |
| 7,896,238 | B2 | 3/2011 | Fein |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders |
| 8,046,256 | B2 | 10/2011 | Chien |
| 8,060,448 | B2 | 11/2011 | Jones |
| 8,060,449 | B1 | 11/2011 | Zhu |
| 8,074,877 | B2 | 12/2011 | Mullen |
| 8,074,879 | B2 | 12/2011 | Harris |
| 8,082,210 | B2 | 12/2011 | Hansen |
| 8,095,113 | B2 | 1/2012 | Kean |
| 8,104,679 | B2 | 1/2012 | Brown |
| RE43,157 | E | 2/2012 | Bishop |
| 8,109,436 | B1 | 2/2012 | Hopkins, III |
| 8,121,942 | B2 | 2/2012 | Carlson |
| 8,121,956 | B2 | 2/2012 | Carlson |
| 8,126,449 | B2 | 2/2012 | Beenau |
| 8,132,723 | B2 | 3/2012 | Serve |
| 8,171,525 | B1 | 5/2012 | Pelly |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza |
| 8,219,489 | B2 | 7/2012 | Patterson |
| 8,224,702 | B2 | 7/2012 | Mengerink |
| 8,225,385 | B2 | 7/2012 | Chow |
| 8,229,852 | B2 | 7/2012 | Carlson |
| 8,265,993 | B2 | 9/2012 | Chien |
| 8,280,777 | B2 | 10/2012 | Mengerink |
| 8,281,991 | B2 | 10/2012 | Wentker et al. |
| 8,328,095 | B2 | 12/2012 | Oder, II |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders |
| 8,401,539 | B2 | 3/2013 | Beenau |
| 8,401,898 | B2 | 3/2013 | Chien |
| 8,402,555 | B2 | 3/2013 | Grecia |
| 8,403,211 | B2 | 3/2013 | Brooks |
| 8,412,623 | B2 | 4/2013 | Moon |
| 8,412,837 | B1 | 4/2013 | Emigh |
| 8,417,642 | B2 | 4/2013 | Oren |
| 8,447,699 | B2 | 5/2013 | Batada |
| 8,453,223 | B2 | 5/2013 | Svigals |
| 8,453,925 | B2 | 6/2013 | Fisher |
| 8,458,487 | B1 | 6/2013 | Palgon |
| 8,484,134 | B2 | 7/2013 | Hobson |
| 8,485,437 | B2 | 7/2013 | Mullen |
| 8,494,959 | B2 | 7/2013 | Hathaway |
| 8,498,908 | B2 | 7/2013 | Mengerink |
| 8,504,475 | B2 | 8/2013 | Brand et al. |
| 8,504,478 | B2 | 8/2013 | Saunders |
| 8,510,816 | B2 | 8/2013 | Quach |
| 8,528,067 | B2 | 9/2013 | Hurry et al. |
| 8,533,116 | B2 | 9/2013 | Davis et al. |
| 8,533,860 | B1 | 9/2013 | Grecia |
| 8,538,845 | B2 | 9/2013 | Liberty |
| 8,555,079 | B2 | 10/2013 | Shablygin |

(56) References Cited

U.S. PATENT DOCUMENTS

| | | |
|---|---|---|
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191722 A1* | 10/2003 | Thompson ......... G06Q 20/3678 705/66 |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0078785 A1 | 4/2007 | Bush et al. |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0134295 A1 | 6/2008 | Bailey et al. |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |

(56) References Cited

U.S. PATENT DOCUMENTS

| | | |
|---|---|---|
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0089847 A1 | 4/2012 | Tu et al. |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |

(56) References Cited

U.S. PATENT DOCUMENTS

| | | |
|---|---|---|
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0222615 A1 | 8/2015 | Allain et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1* | 10/2016 | Youdale ................ H04W 48/02 |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0228728 A1 | 8/2017 | Sullivan |
| 2017/0236113 A1 | 8/2017 | Chitalia |
| 2017/0293914 A1 | 10/2017 | Girish |
| 2017/0295155 A1 | 10/2017 | Wong et al. |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2018/0337925 A1* | 11/2018 | Wallace ................ H04L 9/3234 |
| 2019/0020478 A1 | 1/2019 | Girish |
| 2019/0066069 A1 | 2/2019 | Faith |
| 2019/0147439 A1 | 5/2019 | Wang |
| 2019/0334884 A1* | 10/2019 | Ross ........................ G06F 21/41 |
| 2019/0356489 A1 | 11/2019 | Palanismy |
| 2019/0384896 A1 | 12/2019 | Jones |
| 2019/0392431 A1 | 12/2019 | Chitalila |
| 2020/0267153 A1* | 8/2020 | Kang ....................... H04L 63/10 |
| 2020/0314644 A1 | 10/2020 | Dean |
| 2022/0179991 A1* | 6/2022 | Jha ....................... G06F 11/3065 |

FOREIGN PATENT DOCUMENTS

| | | |
|---|---|---|
| KR | 20150109323 A | 10/2015 |
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |

(56) References Cited

FOREIGN PATENT DOCUMENTS

| | | |
|---|---|---|
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Panes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

* cited by examiner

VIRTUAL ACCESS CREDENTIAL INTERACTION SYSTEM AND METHOD

CROSS-REFERENCES TO RELATED APPLICATIONS

This application is a National Stage of International Application No. PCT/US2019/032851, filed on May 17, 2019, which is herein incorporated by reference in its entirety for all purposes.

BACKGROUND

As users increasingly interact with resource providers using communication devices over networks, including the internet, the risks to the user have increased that an interaction may be a fraudulent interaction. Users can interact with access devices using an account identifier. The user's account identifier can identify the user's account. To gain access to a resource from the access device, the user supplies their account identifier to the access device. However, access devices can potentially be malicious and can later use received account identifiers to perform malicious interactions.

Further, users can transact with resource providers to purchase resources, for example, using credit or debit cards. However, a user may have reached their credit limit on a credit card and/or may be out of funds in an account linked to a debit card, and may not be able to purchase resources with said cards. The user may have additional funds in, for example, a brokerage account. The user can access their brokerage account, initiate a sale of securities, wait 1-3 days for a confirmation of the sale of the securities, transfer the acquired funds from the sale to an account linked to their debit card, and then reinitiate the transaction with the resource provider if the resource is not sold out or has otherwise become unavailable.

Further, the user may have sold too much from their brokerage account to obtain funds for the transaction. For example, they may have sold one stock for $250, but only need $200 to purchase the resource. These extra funds are now sitting the user's account linked to their debit card, and thus the extra funds are not being used optimally.

Embodiments of the invention address this problem and other problems individually and collectively.

SUMMARY

Embodiments of the invention are related to methods and systems for performing and authorizing interactions with virtual access credentials that can be linked to account identifiers.

One embodiment is directed to a method comprising: receiving, by an authorizing entity computer, a request for a virtual access credential from a communication device operated by a user; transmitting, by the authorizing entity computer, the virtual access credential to the communication device operated by the user; receiving, by the authorizing entity computer, an authorization request message comprising the virtual access credential from an access device associated with a resource provider for an interaction between the user and the resource provider; determining, by the authorizing entity computer, an account identifier linked to the virtual access credential, the account identifier being associated with an account maintained by an external entity computer that is external to the authorizing entity computer; determining, by the authorizing entity computer, that the interaction is authorized based upon determining the account identifier associated with the virtual access credential; generating, by the authorizing entity computer, an authorization response message; and transmitting, by the authorizing entity computer, the authorization response message to the access device.

Another embodiment is directed to an authorizing entity computer comprising: a processor; a memory device; and a computer-readable medium coupled to the processor, the computer-readable medium comprising code executable by the processor for implementing a method comprising: receiving a request for a virtual access credential from a communication device operated by a user; transmitting the virtual access credential to the communication device operated by the user; receiving an authorization request message comprising the virtual access credential from an access device associated with a resource provider for an interaction between the user and the resource provider; determining an account identifier linked to the virtual access credential, the account identifier being associated with an account maintained by an external entity computer that is external to the authorizing entity computer; determining that the interaction is authorized based upon determining the account identifier associated with the virtual access credential; generating an authorization response message; and transmitting the authorization response message to the access device.

One embodiment is directed to a method performed by a communication device operated by a user, the method comprising: transmitting, by the communication device to an authorizing entity computer, a request for a virtual access credential; receiving, by the communication device from authorizing entity computer, the virtual access credential, the virtual access credential being linked to an account maintained by an external entity computer that is external to the authorizing entity computer; and providing, by the communication device, the virtual access credential or an access token associated with the virtual access credential to an access device associated with a resource provider, which conducts an interaction with the user for the user to access a resource using an account identifier associated with the virtual access credential, the access device generating an authorization request message comprising the virtual access credential or the access token to a processing computer in communication with the authorizing entity computer, which determines if the user is authorized to access the resource.

Another embodiment is directed to a communication device operated by a user comprising: a processor; a memory device; and a computer-readable medium coupled to the processor, the computer-readable medium comprising code executable by the processor for implementing a method comprising: transmitting, by the communication device to an authorizing entity computer, a request for a virtual access credential; receiving, by the communication device from authorizing entity computer, the virtual access credential, the virtual access credential being linked to an account maintained by an external entity computer that is external to the authorizing entity computer; and providing, by the communication device, the virtual access credential or an access token associated with the virtual access credential to an access device associated with a resource provider, which conducts an interaction with the user for the user to access a resource using an account identifier associated with the virtual access credential, the access device generating an authorization request message comprising the virtual access credential or the access token to a processing computer in communication with the authorizing entity computer, which determines if the user is authorized to access the resource.

Further details regarding embodiments of the invention can be found in the Detailed Description and the Figures.

DETAILED DESCRIPTION

Figure 1:
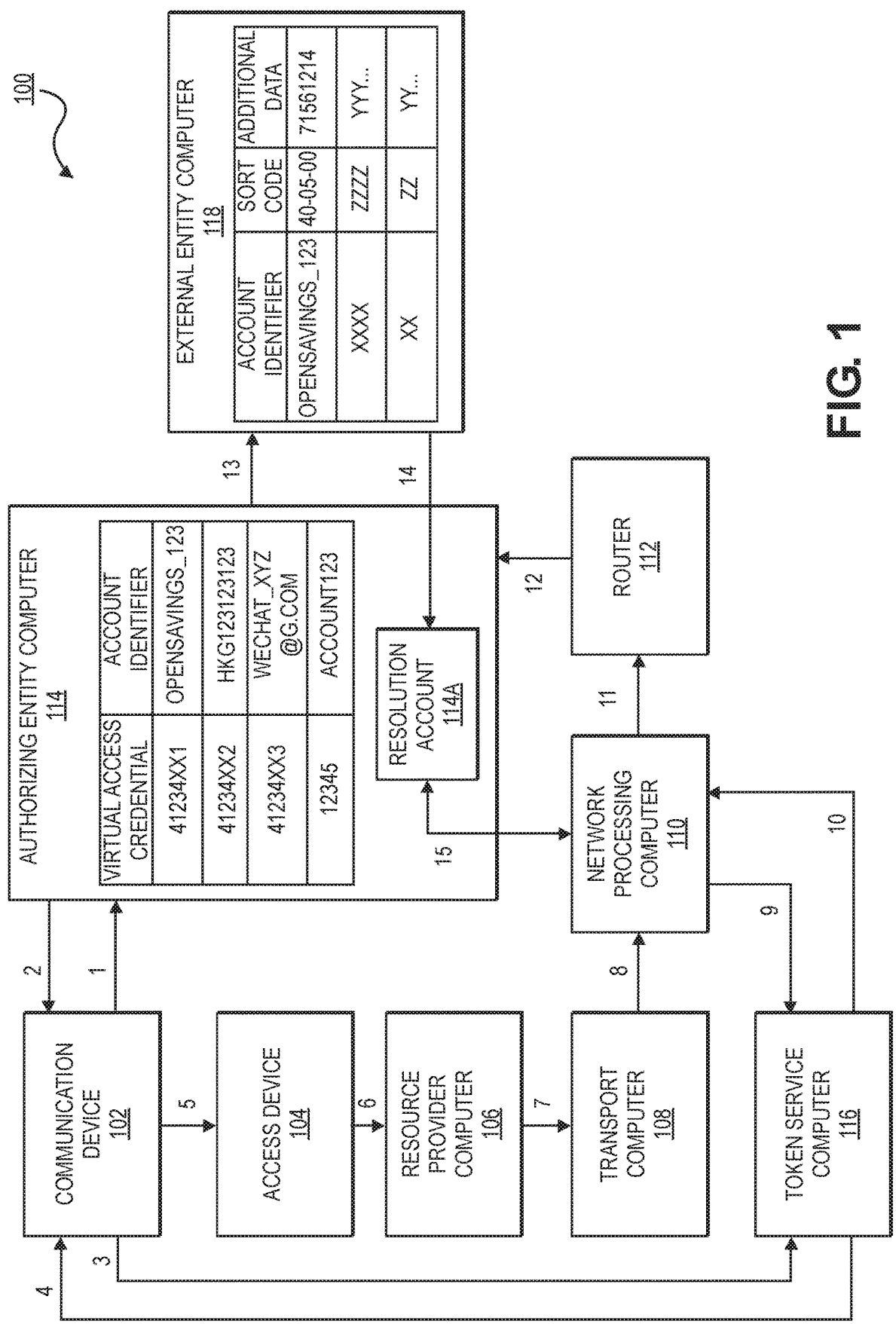
FIG. 1 shows a virtual credential interaction system and method according to embodiments.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "communication device" may be a device that is operated by a user. Examples of communication devices may include a mobile phone, a smart phone, a card, a personal digital assistant (PDA), a laptop computer, a desktop computer, a server computer, a vehicle such as an automobile, a thin-client device, a tablet PC, etc. Additionally, communication devices may be any type of wearable technology device, such as a watch, earpiece, glasses, etc. The communication device may include one or more processors capable of processing user input. The communication device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The communication device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. A payment device may be an example of a communication device.

A "payment device" can include a device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. If the payment device is in the form of a debit, credit, or smartcard, the payment device may also optionally have features such as magnetic stripes. Such devices can operate in either a contact or contactless mode.

An "access device" may be any suitable device that can interact with a communication device (e.g., a payment card or mobile phone). An access device may communicate with or may be at least a part of a merchant computer. Access devices may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, and security systems, remote computers operating Websites, and the like. In some embodiments, an access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a communication device.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. This specific information may be characterized as access information in some embodiments. In other embodiments, access data could include data that can be used to access a location. Such information may be ticket information for an event, data to access a building, transit ticket information, etc. Access data can be part of a physical access device or a virtual access device.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

The term "verification" and its derivatives can include a process that utilizes information to determine whether an underlying subject is valid under a given set of circumstances. Verification may include any comparison of information to ensure some data or information is correct, valid, accurate, legitimate, and/or in good standing.

A "digital wallet" or an e-wallet can include a software application that allows an individual to conduct electronic commerce transactions. A digital wallet may store payment credentials, bank account information, one or more digital wallet identifiers and/or the like and can be used in a variety of transactions, such as but not limited to eCommerce, social networks, money transfer/personal payments, mobile commerce, proximity payments, and/or the like for retail purchases, digital goods purchases, utility payments, transferring funds between users, and/or the like. A digital wallet may be designed to streamline the purchase and payment process. A digital wallet may also store transaction records (e.g., electronic receipts).

A "digital wallet provider" may include an entity, such as an issuing entity or third party service provider, that issues a digital wallet to a user that enables the user to conduct transactions. A digital wallet provider may provide standalone user-facing software applications that store account numbers, or representations of the account numbers (e.g., tokens), on behalf of an account holder (or other user) to facilitate transactions at more than one unrelated transacting entity, perform person-to-person transactions, or load value into the digital wallet. A digital wallet provider may enable a user to access its account via a personal computer, mobile device or access device.

A "token" may be a substitute value for a credential. A token may be a string of numbers, letters, or any other suitable characters. Examples of tokens include payment tokens, access tokens, personal identification tokens, etc. For example, a payment token may include an identifier for a payment account that is a substitute for an account identifier, such as a primary account number (PAN) or a virtual access credential. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN, other account identifier, or virtual access credential from the token value may not be computationally derived. Further, in some embodiments, the token format may be configured to allow the entity receiving the token to identify it as a token and recognize the entity that issued the token.

A "token provider" or "token service system" can include a system that that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN. In some embodiments, a token service system may include a tokenization computer alone, or in combination with other computers such as a transaction processing system.

A "token vault" can include a repository that maintains established token-to-PAN mappings. According to various embodiments, the token vault may also maintain other attributes of a token requester that may be determined at the time of registration and that may be used by the token service provider to apply domain restrictions or other controls during transaction processing. In some embodiments, the token vault may be provided as a part of the token service provider. Alternatively, the token vault may be a remote repository accessible by the token service provider. The token vault, due to the sensitive nature of the data mappings that are stored and managed in it, may be protected by strong underlying physical and logical security.

A "token request message" may be an electronic message for requesting a token. A token request message may include information usable for identifying an account or digital wallet, and/or information for generating a token. For example, a token request message may include credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, a token request message may be formatted as an authorization request message (e.g., an ISO 8583 message format). In some embodiments, the token request message may include a flag or other indicator specifying that the message is a token request message.

A "token response message" may be a message that responds to a token request. A token response message may include an indication that a token request was approved or denied. A token response message may also include a token, mobile device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may be formatted as an authorization response message (e.g., an ISO 8583 message format). In some embodiments, the token response message may include a flag or other indicator specifying that the message is a token response message.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

"Account identifier" or "identifier" may include any suitable information associated with an account (e.g. a value account, a resource access account, etc. and/or a device associated with the account). Such information may be directly related to the account or may be derived from information related to the account. Examples of account information may include an account number (e.g. a primary account number (PAN)), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Account identifiers may include resource provider specific account identifiers or universal identifiers. A resource provider specific account identifier may identify an account issued by a resource provider computer. A universal identifier may identify an account issued by account issuers (e.g. open loop issuers). A universal identifier may have a different format than a resource provider specific account identifier. An issuer of the account may be identified by analyzing the format of the account identifier. In some embodiments, a universal identifier associated with a resource provider specific account may be generated by a resource provider processor system. In such embodiments, the resource provider processor system may act as the issuer for the generated universal identifier.

A "virtual access credential" can include a virtualized credential which may allow access. A virtual access credential can be linked with an account identifier, for example, by an authorizing entity. In some embodiments, a virtual access credential can comprise an access code capable of being read by an access device to grant the user access to a secure location. A virtual access credential can include any suitable number of alphanumeric characters. For example, a virtual access credential can include a 16 digit value.

A "secure location" can include a location that is secured against unauthorized access. Illustrative secure locations can include a place of work, a house, a warehouse, a transit platform, a military base, etc. In some embodiments, the secure location may have limited access, where a user can be authorized access.

A "value account" can include an arrangement by which a first entity maintains a value on behalf of a second entity. In some embodiments, a value account can be maintained by an external entity computer for a user. A value account can be associated with an account identifier. In some embodiments, a user can be associated with one or more value accounts. In some embodiments, a value account can include a savings account, a checking account, a credit card account, a debit card account, a brokerage account, a cryptocurrency account, and/or the like.

A "resolution account" can include an arrangement by which a first entity maintains funds on behalf of a second entity for use during a resolution process. In some embodiments, a resolution account may be maintained by an authorizing entity computer for each external entity. In other embodiments, one resolution account may be maintained by the authorizing entity computer for a plurality of external entities (e.g., 2, 4, 10, 30, etc. external entities). In yet other embodiments, a resolution account may be maintained by the authorizing entity computer for external entities that share at least one common characteristic, for example, location (e.g., state, country, etc.), account types maintained by the external entity computer (e.g., access account, value account, etc.), currency type of a value account (e.g., dollar, yen, euro, etc.), and/or any other characteristic of the external entities and/or the account(s) maintained by the external entities.

A "resolution process" can include an action of resolving a particular matter. An authorizing entity computer can perform a resolution process between the authorizing entity computer and a transport computer associated with a resource provider. In some embodiments, the resolution process can include one or more external entity computers. In other embodiments, a resolution process can include a settlement process. The settlement process can include transferring funds between the authorizing entity computer, external entity computers, network processing computers, and transport computers. In some embodiments, a resolution process can include the use of a resolution account.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "confirmation request message" may be an electronic message that requests confirmation of data. In some embodiments, a confirmation request message can be sent from an authorizing entity computer to an external entity computer. A confirmation request message can request confirmation of any suitable data. For example, a confirmation request message can request confirmation of an amount in a value account maintained by the external entity computer for a user.

A "confirmation response message" may be a message that responds to a confirmation request. In some cases, a confirmation response message may be an electronic message reply to a confirmation request message. The confirmation response message can include, for example, a confirmation indication (e.g., "1" for confirmed, "0" for not confirmed). In some embodiments, the confirmation response message can also include an amount of funds to be transferred from the external entity computer to the authorizing entity computer, specifically, from a user's account to a resolution account.

An "authentication request message" may be an electronic message that requests authentication of something. In some embodiments, an authentication request message can be sent from an authorizing entity computer to a communication device. An authentication request message can request authentication of any suitable user, device, and/or entity. For example, an authentication request message can request authentication of a user operating a communication device. For example, the authorizing entity computer can request a user's password, biometric, and/or other authentication data in an authentication request message transmitted to the communication device.

An "authentication response message" may be a message that responds to an authentication request. In some cases, an authentication response message may be an electronic message reply to an authentication request message. The authentication response message can include credentials (e.g., password, etc.), biometric templates, and/or other data capable of authenticating a user.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

An "acquirer" may include be a business entity (e.g., a commercial bank) that has a business relationship with a particular merchant or other entity. Some entities can perform both issuer and acquirer functions. Some embodiments may encompass such single entity issuer-acquirers.

An "authorizing entity" may be an entity that authorizes a request. Examples of an authorizing entity may be a governmental agency, a document repository, an access administrator, etc. An authorizing entity may operate an authorizing entity computer.

An "external entity computer" can be peripheral computer operated by an external entity. In some embodiments, an external entity computer can be operated by an issuer. An "issuer" can include a business entity (e.g., a bank) that issues and optionally maintains a value account for a user. In some embodiments, an external entity computer can be a computer operated by an entity that operates a secure location.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments of the present disclosure allow for an authorizing entity computer capable of generating virtual access credentials associated with account identifiers. A user of a communication device can request a virtual access credential for an account identifier from the authorizing entity computer. The communication device can later perform an interaction with, for example, an access device using the virtual access credential (or associated token). During the interaction, the authorizing entity computer can receive an authorization request message comprising the virtual access token from the access device.

The authorizing entity computer can then determine an account identifier linked to the virtual access credential. The account identifier can be associated with the account maintained by an external entity computer. For example, the account can be a value account (e.g., a savings account, checking account, credit card account, debit card account, brokerage account, cryptocurrency account, and/or the like), an access account (e.g., a building access account, a secure data access account, etc.), and/or any other suitable user account.

After receiving the authorization request message, the authorizing entity computer can determine whether or not to authorize the interaction. In some embodiments, the authorizing entity computer can confirm the interaction with the external entity computer (e.g., with a confirmation request message). In other embodiments, the authorizing entity computer can determine whether or not to authorize the interaction without requesting confirmation from the external entity computer. The authorizing entity computer can then generate an authorization response message and transmit the authorization response message to the access device.

FIG. 1 shows a virtual access credential interaction system 100 and method according to embodiments. FIG. 1 includes a communication device 102, an access device 104, a resource provider computer 106, a transport computer 108, a network processing computer 110, a router 112, an authorizing entity computer 114, a token service computer 116, and an external entity computer 118. The authorizing entity computer 114 can maintain a resolution account 114A.

Before describing the method illustrated in FIG. 1 in detail, a brief description of the virtual access credential interaction system 100 infrastructure will be provided for context.

A user may conduct an interaction at a resource provider (e.g., a merchant) using a communication device 102. The interaction may be a payment interaction (e.g., for the purchase of a good or service), an access transaction (e.g., for access to a secure building, transit system, etc.), or any other suitable interaction. The user's communication device 102 can interact with an access device 104 at a resource provider associated with resource provider computer 106. For example, the user may tap the communication device 102 against an NFC reader in the access device 104. Alternatively, the user may provide a virtual access credential to the resource provider electronically, such as in an online interaction. In some cases, the communication device 102 may transmit, to the access device 104, a token associated with the virtual access credential.

In order to authorize an interaction, an authorization request message may be generated by the access device 104 or the resource provider computer 106 and then forwarded to a transport computer 108 (e.g., an acquirer computer). After receiving the authorization request message, the authorization request message can then be sent to a network processing computer 110. The network processing computer 110 then forwards the authorization request message to the corresponding authorizing entity computer 114 associated with an authorizing entity associated with the virtual access credential.

After the authorizing entity computer 114 receives the authorization request message, the authorizing entity computer 114 can send an authorization response message back to the network processing computer 110 to indicate whether the current interaction is authorized (or not authorized). The network processing computer 110 then forwards the authorization response message back to the transport computer 108. In some embodiments, the network processing computer 110 may decline the interaction even if the authorizing entity computer 114 has authorized the interaction, for example depending on a value of a fraud risk score. The transport computer 108 then sends the response message back to the resource provider computer 106.

After the resource provider computer 106 receives the authorization response message, the resource provider computer 106 may then provide the authorization response message to the user. The response message may be displayed by the access device 104, or may be printed out on a physical receipt. Alternately, if the interaction is an online interaction, the resource provider may provide a web page or other indication of the authorization response message as a virtual receipt which may be viewed with the communication device 102. In some embodiments, the receipts may include transaction data for the transaction.

Figure 3:
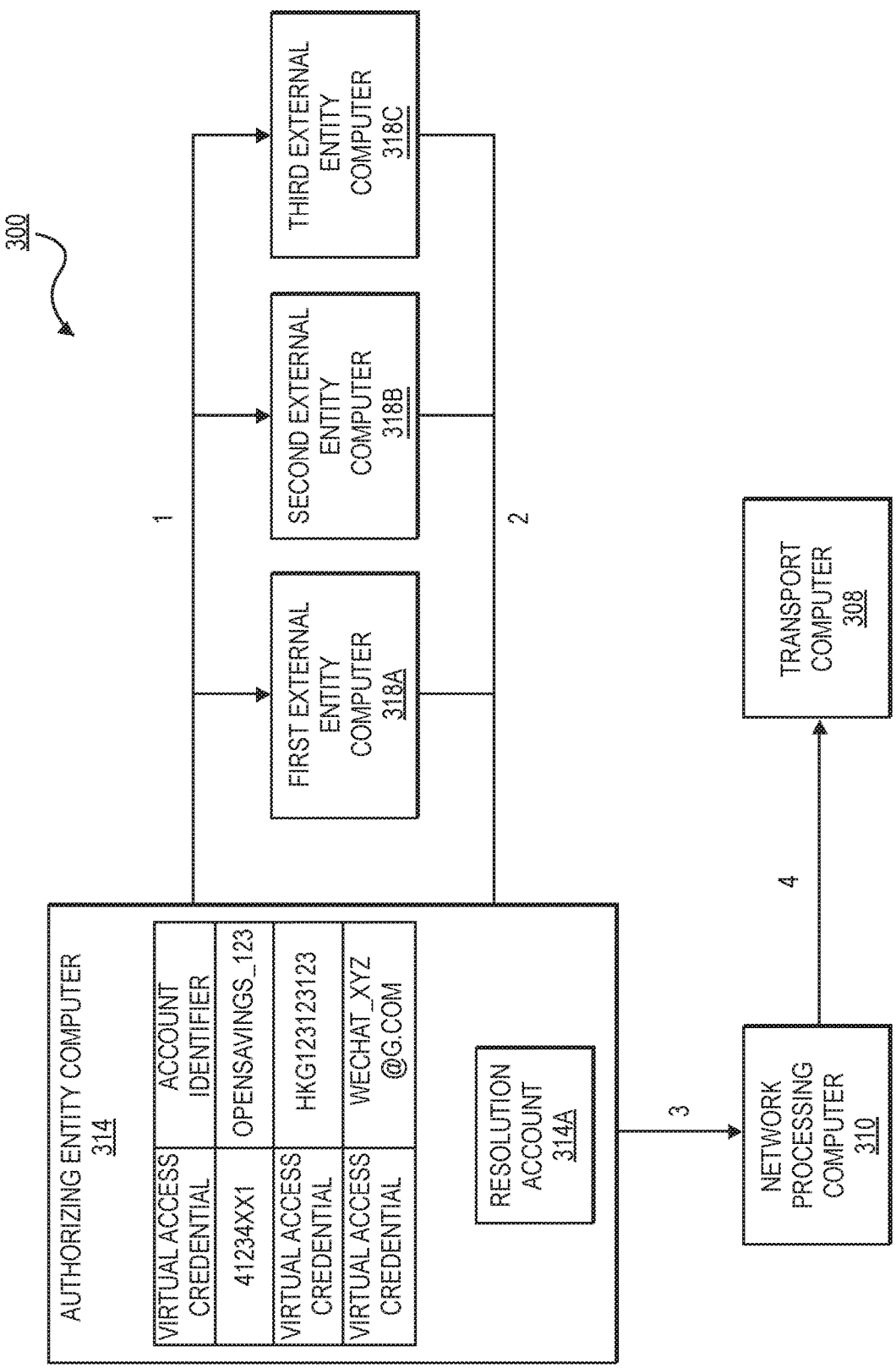
FIG. 3 shows a resolution process according to embodiments.

At the end of the day, a resolution process can be conducted by the authorizing entity computer 114, as described in further detail in FIG. 3. A resolution process may include a process of exchanging financial details between an acquirer and an authorizing entity to facilitate posting to a user's value account and reconciliation of the user's settlement position.

The method of FIG. 1 will now be described in further detail. At step 1, the communication device 102 can generate a request for a virtual access credential. The request for the virtual access credential can include any suitable data, for example, the request for the virtual access credential can include an account identifier associated with an account (e.g., a value account, access account, etc.) maintained by the external entity computer 118 on behalf of the user. The request for the virtual access credential can also include user data, for example, a name of the user, an address, a phone number, a user device identifier, and/or any other information capable of identifying the user and/or the communication device 102.

The communication device 102 can transmit the request for the virtual access credential to the authorizing entity computer 114 over any suitable communication channel. For example, the request for the virtual access credential can be transmitted over a Wi-Fi communication channel.

As an illustrative example, the communication device 102 can generate the request for the virtual access credential comprising an account identifier for an access account. The access account may be maintained by the external entity computer 118, which may be an entity that operates a secure location. The virtual access credential can comprise an access code that is capable of being read by the access device to grant the user access to the secure location.

In some embodiments, the request for the virtual access credential can further comprise communication data for communicating with external entities. For example, the request for the virtual access credential can comprise the communication data for communicating with the external entity which maintains the account associated with the account identifier.

After receiving the request for the virtual access credential, the authorizing entity computer 114 can generate the virtual access credential. The authorizing entity computer 114 can generate the virtual access credential in any suitable manner. In some embodiments, the authorizing entity computer 114 can iterate though a range of values as new virtual access credentials are created. For example, the authorizing entity computer 114 can generate a first virtual access credential as "2000001." Subsequent virtual access credentials can be "2000002," "2000003," "2000004," etc.

In other embodiments, the authorizing entity computer 114 can generate the virtual access credential based on the received account identifier and/or other data receive in the request for the virtual access credential. For example, the authorizing entity computer can hash the account identifier to determine the virtual access credential.

After generating the virtual access credential, the authorizing entity computer 114 can store a table comprising a plurality of virtual access credentials linked to a plurality of different account identifiers. The virtual access credential and the account identifier can be stored in the table.

In some embodiments, the table can further comprise a plurality of user identifiers, each user identifier being linked to one or more virtual access credential and account identifier pairs. For example, a first user with a user identifier of "User_XYZ" can be linked to two virtual access credential and account identifier pairs. The user identifier "User_XYZ" can be linked to a first virtual access credential of "41xxxxx00" and a first account identifier of "account123." The same user identifier "User_XYZ" can also be linked to a second virtual access credential of "41xxxxx01" and a second account identifier of "account456." In some embodiments, the first account identifier and the second account identifier can correspond to accounts maintained by a single external entity computer. In other embodiments, the first account identifier and the second account identifier can respectively correspond to accounts maintained by a first external entity computer and a second external entity computer.

In other embodiments, the table can further comprise communication data for communicating with external entities. The communication data can include any suitable data that provides information regarding communicating with an external entity. The communication data can include, for example, an address (e.g., IP address), formatting requirements, etc. For example, an account identifier stored in the table can be linked with communication data associated with the external entity that maintains the account associated with the account identifier.

The table can be stored in any suitable database. For example, the database can include a conventional, fault tolerant, relational, scalable, secure database such as those commercially available from Oracle™ or Sybase™. An example, database schema can be implemented as shown in Table 1.

TABLE 1

Database Schema

| Interaction DB | User DB | OTP |
|---|---|---|
| ExternalEntityAccountUid | ExternalEntityAccountUid | ExternalEntityAccountUid |
| PaymentStatus | ResolutionAccount | otpValue |
| InteractionId | PhoneNumber | otpExpiry |
| MTI | ExternalEntityId | otpFailureCount |
| ProcCodeTrxType | AccessToken | |
| AuthAmount | RefreshToken | |
| CardholderAmount | VirtualAccessCredential | |
| InteractionCurrency | | |
| TransmissionDateTime | | |
| Rrn | | |
| ResourceProvider | | |
| AuthCode | | |
| InteractionId | | |
| Status | | |
| SettlementDate | | |

As an illustrative example, a virtual access credential of "12345" can be linked with an account identifier of "account123" which, in turn, can be linked with the communication data including a network destination "127.0.0.0," a netmask "255.0.0.0," a gateway "127.0.0.1," an interface "127.0.0.1," and a metric "1." The network destination and the netmask together can describe a network ID. The gateway can indicate a next hop (i.e., points to the gateway through which the network can be reached. The interface can indicate what locally available interface can reach the gateway (e.g., a network interface). The metric can indicate an associated cost of using the indicated route. For example, the metric can be used to determine a most efficient route to reach the external entity computer 118 if more than one route is detailed in the table. Further, the account identifier of "account123" can be associated with communication data including a message type. For example, the communication data can include formatting instructions, such as but not limited to, ISO 8583, ISO 20022, appropriate API commands, and/or any other suitable format capable of including data described herein. In some embodiments, the communication data can indicate that the gateway is an XS2A (access to account) gateway, a native gateway, a local network gateway, or any other suitable type of gateway.

At step 2, the authorizing entity computer 114 can transmit the virtual access credential to the communication device operated by the user. For example, in some embodiments, the authorizing entity computer 114 can push provision the virtual access credential to a digital wallet stored on the communication device 102. In some embodiments, the authorizing entity computer 114 can encrypt the virtual access credential and then transmit the encrypted virtual access credential to the communication device 102.

In some embodiments, at step 3, after receiving the virtual access credential from the authorizing entity computer 114, the communication device 102 can generate a token request message. The token request message can include a request for a token associated with the virtual access credential. The communication device 102 can then transmit the token request message to the token service computer 116.

In some embodiments, at step 4, after receiving the virtual access credential from the communication device 102, the token service computer 116 can generate a token. The token service computer 116 can generate the token in any suitable manner. For example, in some embodiments, the token service computer 116 can retrieve a token from a database and can associate the token with the virtual access credential. In other embodiments, the token service computer 116 can generate the token based on the virtual access credential. For example, the token service computer 116 can transform the virtual access credential via a mathematical equation (e.g., a hash function, etc.) into the token.

In some embodiments, the token can be an access token. After generating the token, the token service computer 116 can generate a token response message comprising the token. The token service computer 116 can then transmit the token response message to the communication device 102.

In some embodiments, after generating the token, the token service computer 116 can store a mapping between the token and the virtual access credential (or other identifying information) into a suitable database, such as a token vault.

Step 5 may occur at any suitable time after step 2 or step 4. At step 5, the communication device 102 can initiate an interaction with the access device 104. The access device 104 can be associated with a resource provider, which conducts an interaction with the user for the user to access a resource (e.g., a secure location) using an account identifier associated with the virtual access credential. The communication device 102 can provide the virtual access credential or the access token associated with the virtual access credential to the access device 104.

For example, the access device 104 may be a device located at an entrance to a secure location. The secure location can be, for example, the user's workplace. The user can tap the communication device 102 on an NFC reader of the access device 104 to gain access to the secure location. The communication device 102 can provide the virtual access credential to the access device 104.

At step 6, after receiving the virtual access credential or the access token, the access device 104 can generate an authorization request message comprising the virtual access credential or the access token. The access device 104 can then provide the authorization request message to the resource provider computer 106.

At step 7, after receiving the authorization request message from the access device 104, the resource provider computer 106 can forward the authorization request message to the transport computer 108.

At step 8, after receiving the authorization request message from the resource provider computer 106, the transport computer 108 can forward the authorization request message to the network processing computer 110.

After receiving the authorization request message, the network processing computer 110 can determine if the authorization request message comprises the virtual access credential or the access token. If the authorization request message comprises the access token, then the network processing computer 110 can proceed to step 9. If the authorization request message comprises the virtual access credential, then the network processing computer 110 can proceed to step 11.

In some embodiments, the network processing computer 110 can determine if the authorization request message comprises the virtual access credential or the access token based on the length and/or size of the data in the authorization request message. For example, the virtual access credentials can have a length of 10 alphanumeric characters, whereas the access token can have a length of 11 alphanumeric characters. In other embodiments, the authorization request message can include a flag, or other data element, that indicates whether the authorization request message includes the virtual access credential or the access token. For example, a flag of "0" can indicate virtual access credential, whereas a flag of "1" can indicate access token.

At step 9, after the network processing computer 110 receives the authorization request message comprising the access token, the network processing computer 110 can provide the access token to the token service computer 116. The network processing computer 110 can request the virtual access credential associated with the access token from the token service computer 116.

At step 10, after receiving the access token from the network processing computer 110, the token service computer 116 can determine the virtual access credential associated with the access token. For example, the token service computer 116 can determine the virtual access credential using the previously stored mapping between the token and the virtual access credential.

At step 11, after receiving the virtual access credential, the network processing computer 110 can transmit the authorization request message comprising the virtual access credential to the authorizing entity computer 114. In some embodiments, the network processing computer 110 can transmit the authorization request message to the authorizing entity computer 114 via a router 112 at steps 11-12.

The authorizing entity computer 114 can receive the authorization request message comprising the virtual access credential for the interaction between the user and the resource provider. The authorizing entity computer 114 can then determine the account identifier linked to the virtual access credential. The account identifier being associated with an account maintained by the external entity computer 118 that is external to the authorizing entity computer 114. For example, the authorizing entity computer 114 can compare the received virtual access credential to the virtual access credentials stored in the table.

For example, the authorizing entity computer 114 may receive the virtual access credential of "12345." The authorizing entity computer 114 can search the table for the virtual access credential of "12345." The authorizing entity computer 114 can determine that the virtual access credential of "12345" is associated with the account identifier of "account123."

The authorizing entity computer 114 can then determine whether or not the interaction is authorized based upon determining the account identifier associated with the virtual access credential. For example, in some embodiments, the account identifier may be associated with an options data field. The options data field can include data indicating whether or not funds/access is guaranteed. The options data field can also indicate whether or not the authorizing entity should perform an authentication process to authenticate the user of the communication device 102. The options data field is described in further detail in FIG. 5.

After determining whether or not to authorize the interaction, the authorizing entity computer 114 can generate an authorization response message. The authorization response message can include an indication of whether or not the interaction is authorized. The authorizing entity computer 114 can then transmit the authorization response message to the access device 104. In some embodiments, the authorizing entity computer 114 can transmit the authorization response message to the access device 104 via the router 112, the network processing computer 110, the transport computer 108, and/or the resource provider computer 106, thus indicating the completion of the interaction.

In some embodiments, steps 13 and 14 can occur before or after the authorizing entity computer 114 determines whether or not to authorize the interaction. At step 13, the authorizing entity computer can format a confirmation request message based upon data in the authorization request message and using the account identifier. The confirmation request message can include a request for the appropriate external entity computer 118 to confirm data related to the interaction. For example, the confirmation request message can request the external entity computer 118 to confirm an amount of the interaction with the amount of the value account maintained by the external entity.

The authorizing entity computer 114 can format the confirmation request message based on the communication data retrieved from the table. For example, the virtual access credential of "12345" linked with the account identifier of "account123," can be further linked to communication data including the network destination "127.0.0.0," the netmask "255.0.0.0," the gateway "127.0.0.1," the interface "127.0.0.1," and the metric "1," as well as ISO 20022. The authorizing entity computer 114 can then format the confirmation request message based on the standard of ISO 20022 as known to one of skill in the art. The authorizing entity computer 114 can convert one type of message to another type of message using the communication data. For example, the authorizing entity computer 114 can convert an ISO 8583 message (e.g., the authorization request message) into an ISO 20022 message (e.g., the confirmation request message), or an HTTP message. The authorizing entity computer 114 can have data mapping software that maps the data elements in fields in one format to fields in another format.

After formatting the confirmation request message, the authorizing entity computer 114 can transmit the confirmation request message to the external entity computer 118.

In some embodiments, the confirmation request message can comprise a sending account identifier (e.g., the user's account), a receiving account identifier (e.g., the resolution account 114A), an amount (e.g., 100), a currency (e.g., $), and a resource provider identifier (e.g., "merchantName"). The external entity computer 118 can receive details regarding the interaction in the confirmation request message, thus reducing the total number of messages transmitted between the authorizing entity computer 114 and the external entity computer 118, since the authorizing entity computer 114 does not need to later provide interaction details to the external entity computer 118.

At step 14, after receiving the confirmation request message, the external entity computer 118 can determine whether or not to confirm the data related to the interaction. For example, the external entity computer 118 can confirm that the value account associated with the account identifier has sufficient funds for the interaction. As another example, the external entity computer 118 can confirm that the user is associated with the access account indicating that the user may access the secure location.

The external entity computer 118 can confirm any suitable data included in the confirmation request message. For example, in some embodiments, the external entity computer 118 can confirm user data, for example, a phone number, that is included in the confirmation request message is the same phone number stored by the external entity computer 118 in association with the user's account.

The external entity computer 118 can then generate and transmit a confirmation response message to the authorizing entity computer 114. The confirmation response message can indicate whether or not the data related to the interaction is confirmed.

In some embodiments, the external entity computer 118 can deposit funds into the resolution account 114A maintained by the authorizing entity computer 114. For example, the external entity computer 118 can deposit an amount equal to the transaction amount into the resolution account 114A from the user's value account selected during the interaction.

As another example, the external entity computer 118 can determine that the resolution account 114A maintained by the authorizing entity computer 114 contains sufficient funds for the interaction. The external entity computer 118 can determine not to transfer funds into the resolution account 114A; rather, the external entity computer 118 can transfer funds from the user's value account into an external entity account.

At step 15, the authorizing entity computer 114 can perform a resolution process between the authorizing entity computer 114 and the transport computer 108 associated with the resource provider. The authorizing entity computer 114 can utilize the resolution account 114A during the resolution process. The resolution process is described in further detail in FIG. 3.

In some embodiments, the user's value account can include any suitable type of value account. For example, the value account can be a savings account, checking account, credit card account, debit card account, brokerage account, cryptocurrency account, and/or the like. As an example, in some cases, if the value account is a savings account or checking account, the external entity computer 118 can transfer funds equal to the transaction amount directly from the user's value account to the resolution account 114A. The authorizing entity computer 114 can wait until confirmation of the funds transfer into the resolution account 114A before authorizing the interaction.

If the value account is a brokerage account (also referred to as a securities account), the external entity computer 118 can instruct the authorizing entity computer 114 to authorize an interaction under a particular value (e.g., $100, $500, $2000, etc.). For example, the authorizing entity computer 114 can link the account identifier of the brokerage account to an options data field that indicates guaranteed funds, as further described in FIG. 5. In this case, after receiving the authorization request message, the authorizing entity computer 114 can authorize the interaction if the transaction amount is under $500. The authorizing entity computer 114 can then notify the external entity computer 118 of the authorized interaction. For example, the authorizing entity computer 114 can transmit at least the account identifier and the transaction amount to the external entity computer 118. The external entity computer 118 can then initiate a sale of the securities in the brokerage account equal to the transaction amount. Once funds equivalent to the sold securities, the external entity computer 118 can transfer the funds to the resolution account 114A or to an external entity account, dependent on whether or not the resolution account 114A has sufficient funds. In some embodiments, if the sale of the user's securities results in a larger amount of funds than the transaction amount, then the external entity computer 118 can place a remainder of the surplus of funds into a second user account (e.g., a money market account, a savings account, etc.).

In some embodiments, the value account can include a digital wallet account. For example, a user can fund a digital wallet account with a bank account. In some embodiments, after receiving the authorization request message, the authorizing entity computer 114 can determine whether or not to authorize a transaction if the digital wallet has funded a resolution account (e.g., the resolution account 114A), where the external entity computer 118 can be a digital wallet entity computer. In other embodiments, the authorizing entity computer 114 can transmit a confirmation request message to the external entity computer 118 (e.g., the digital wallet entity computer). The confirmation request message can request the digital wallet entity computer to confirm that the user's value account (e.g., digital wallet account) has a sufficient balance for the current interaction. If the digital wallet entity computer determines that the value account has sufficient funds, then the digital wallet entity computer can transmit a confirmation response message to the authorizing entity computer 114 indicating a confirmation (i.e., that there are sufficient funds to perform the transaction). The authorizing entity computer 114 can then transfer funds from the value account to the resolution account 114A. The authorizing entity computer 114 can then, at any suitable point, perform a resolution process with the resolution account 114A and the funds therein. In some embodiments, the authorizing entity computer 114 can wait to transfer funds from the value account until performing the resolution process.

Figure 2:
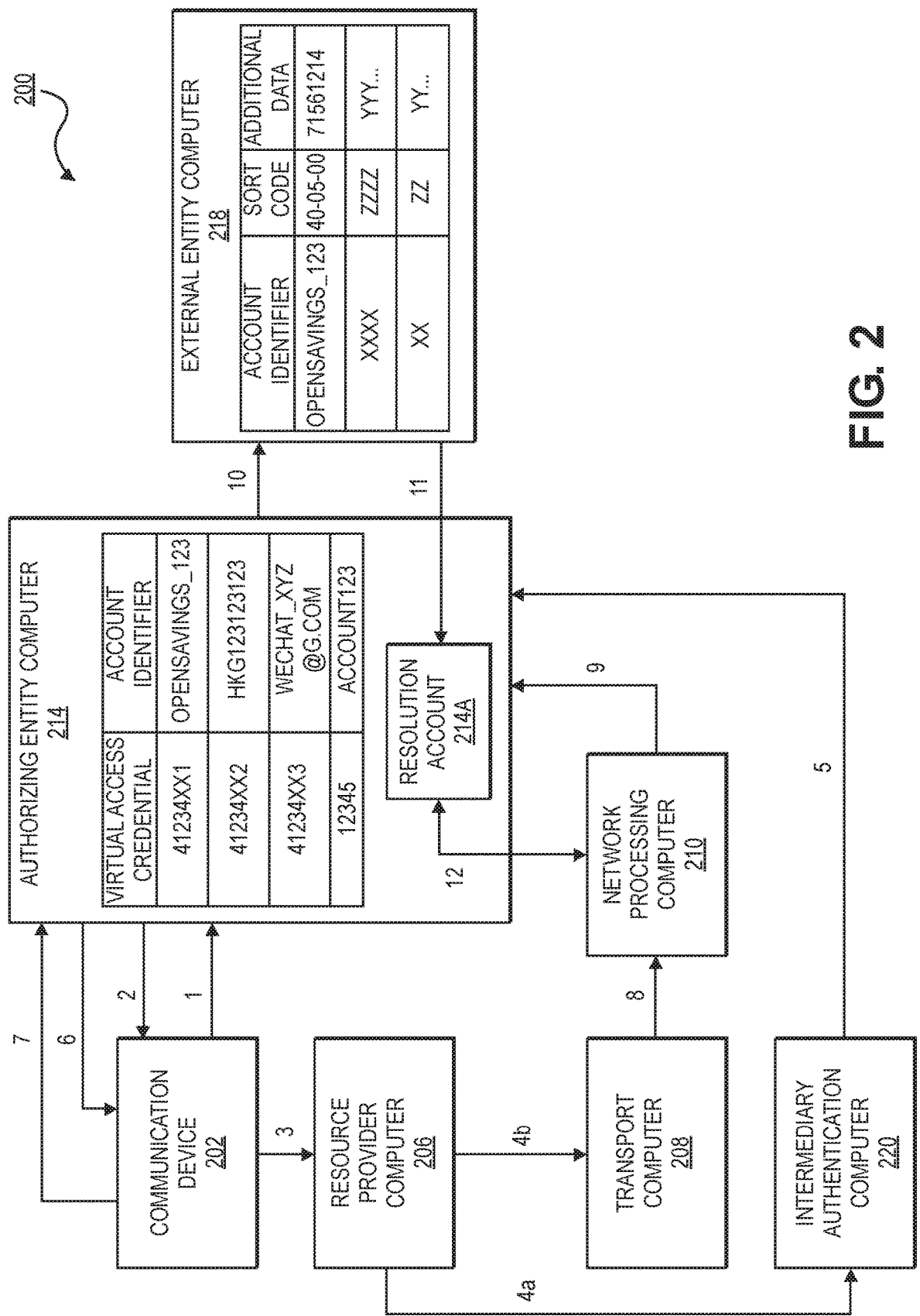
FIG. 2 shows an alternate virtual credential interaction system and method according to embodiments.

FIG. 2 shows an alternate virtual credential interaction system and method according to embodiments. The method illustrated in FIG. 2 will be described in the context of a user performing an online interaction with a resource provider computer, where the resource provider computer determines that the user should be authenticated. It is understood, however, that the invention can be applied to other circumstances.

Steps 1 and 2 can be similar to steps 1 and 2, respectively, of FIG. 1. For example, the communication device 102 can request a virtual access credential from the authorizing entity computer 214. The communication device 202 can receive the virtual access credential associated with the user's account.

At step 3, the communication device 202 can initiate an interaction with the resource provider computer 206. For example, the communication device 202 can connect to a webpage hosted by the resource provider computer 206 on the Internet. The communication device 202 can transmit the virtual access credential to the resource provider computer 206.

As an illustrative example, a user of the communication device 202 can request access to a building. The user can proceed to the building access webpage hosted by the resource provider computer 206 using the communication device 202. The communication device 202 can transmit, to the resource provider computer 206, the virtual access credential which can include an access code that is capable of being read by the resource provider computer 206 to grant the user access to the secure location (e.g., the building).

At step 4a, after receiving the virtual access credential, the resource provider computer 206 can perform an authentication process to authenticate the user. In some embodiments, the resource provider computer 206 may determine that each interaction should include an authentication process. In other embodiments, the resource provider computer 206 can perform the authentication process based on the type of interaction. For example, the resource provider computer 206 can perform the authentication process if the interaction is an online interaction or if the interaction is a card-present interaction. The resource provider computer 206 can transmit a request to perform the authentication process comprising the virtual access credential to an intermediary authentication computer 220. Step 4b can be similar to step 7 of FIG. 1. The request to perform the authentication process can further comprise details regarding the interaction. For example, if the user is attempting to access a secure location, then the details regarding the interaction can include a timestamp of attempted access, a building and/or unit number, an address of the secure location, the user's phone number, and/or any other suitable interaction data.

At step 4b, the resource provider computer 206 can generate an authorization request message comprising the virtual access credential. The resource provider computer 206 can then transmit the authorization request message to the transport computer 208.

In some embodiments, the resource provider computer 206 can perform steps 4a and 4b concurrently.

At step 5, the intermediary authentication computer 220 can forward the virtual access credential to the authorizing entity computer 214. In some embodiments, the intermediary authentication computer 220 can be associated with the authorizing entity computer 214. In some embodiments, the intermediary authentication computer 220 can include a request to perform an authentication process to authenticate the user along with the virtual access credential in any suitable data packet and/or message sent to the authorizing entity computer 214. In some embodiments, the resource provider computer 206 can transmit the request to perform the authentication process comprising the virtual access credential directly to the authorizing entity computer 214.

At step 6, after receiving the virtual access credential along with a request to perform an authentication process, the authorizing entity computer 214 can determine the communication device 202 associated with the received virtual access credential. For example, the authorizing entity computer 214 can determine a communication device identifier and/or a user identifier stored in the table and linked with the virtual access credential, as described herein.

In some embodiments, the authorizing entity computer 214 can evaluate the received interaction data (e.g., secure location address, user's phone number, timestamp of attempted access, etc.) to determine whether or not to authenticate the user. For example, the authorizing entity computer 214 can determine that the user's phone number is associated with the secure location address. However, for example, the authorizing entity computer 214 can further determine that the timestamp of attempted access of 1:00 PM on Saturday is not similar to the user's typical times of attempted access to access the secure location (e.g., around 8:00 AM on weekdays when the user gets to work). In some embodiments, the authorizing entity computer 214 can determine an authentication risk value based on the data received (e.g., interaction data). For example, the authorizing entity computer 214 can determine an authentication risk value in the range of 0-100. For the above described interaction data, the authorizing entity computer 214 may determine an authentication risk value of 50.

The authorizing entity computer 214 can compare the authentication risk value to a predetermined threshold. The predetermined threshold can be any suitable value in the same range as the authentication risk values. The predetermined threshold can indicate whether or not the authorizing entity computer 214 should request further authentication from the user. For example, the authorizing entity computer 214 can compare the determined authentication risk value of 50 to a predetermined threshold of 75. Since the authentication risk value is less than the predetermined threshold, the authorizing entity computer 214 can generate an authentication request message as described below. If the authentication risk value is greater than or equal to the predetermined threshold, then the authorizing entity computer 214 can determine that the user is authenticated. The authorizing entity computer 214 can then, once the authorization request message is received, determine whether or not to authorize the interaction.

The authorizing entity computer 214 can then generate an authentication request message. The authentication request message can include a request for the user to authenticate themselves. As an example, the authentication request message can include a request for a password. In some embodiments, the authentication request message can further include a request to use the account identifier associated with the virtual access credential. After generating the authentication request message, at step 6, the authorizing entity computer 214 can transmit the authentication request message to the communication device 202.

At step 7, after receiving the authentication request message from the authorizing entity computer 214, the communication device 202 can prompt the user to authenticate themselves based on a particular type of authentication indicated in the authentication request message. For example, the authentication request message can request authentication using any suitable authentication data. For example, authentication data can include passwords (e.g., user password, one time password (OTP), etc.), biometric templates, and/or other suitable identifying information.

The user can input authentication data, for example, a password. The communication device 202 can generate an authentication response message comprising the authentication data. In some embodiments, the authentication response message can further include a response to use the account identifier. The communication device 202 can then transmit the authentication response message to the authorizing entity computer 214.

In some embodiments, the authentication request message can further comprise one or more account identifiers that the authorizing entity computer 214 determined to be associated with the user, as described herein. The communication device 202 can display the one or more account identifiers to the user. The user can select one of the account identifiers to confirm that they wish to interact with that account identifier. In some embodiments, the selected account identifier can be the same account identifier that the user previously selected corresponding to the virtual access credential provided to the access device 204. In other embodiments, the selected account identifier can be a different account identifier than the previously selected account identifier.

The communication device 202 can include the selected account identifier in the authentication response message transmitted to the authorizing entity computer 214. In this case, the authorizing entity computer 214 can later authorize the interaction, as described herein, with the selected account identifier.

The authorizing entity computer 214 can then determine whether or not the authentication data is valid. For example, the authorizing entity computer 214 can determine whether or not the password that the user provided is the correct password, for example, by comparing the received password to a stored hashed password, as known to one of skill in the art.

In some embodiments, the authorizing entity computer 214 can communicate with the external entity computer 218 to authenticate the user. For example, the authorizing entity computer 214, prior to step 6, can notify the external entity computer 218 of the pending authentication process. The authorizing entity computer 214 can query the external entity computer 218 to determine which authentication data to request from the user (e.g., password, biometric template, etc.). The external entity computer 218 can respond to the authorizing entity computer 214 with the appropriate response indicating what authentication to request from the user. The authorizing entity computer 214 can then transmit the authentication request message including the request for the authentication data as indicated by the external entity computer 218, to the communication device 202 as described in step 6.

At step 8, the transport computer 208 can transmit the authorization request message to the network processing computer 210. At step 9, the network processing computer 210 can transmit the authorization request message to the authorizing entity computer 214. In some embodiments, the network processing computer 210 can transmit the authorization request message via a router (e.g., the router 112 of FIG. 1).

After receiving the authorization request message as well as the authentication response message, the authorizing entity computer 214 can determine whether or not to authorize the interaction between the user and the resource provider. For example, if the authentication response message includes authentication data that does not match stored authentication data (i.e., the authentication data is incorrect), then the authorizing entity computer 214 can determine not to authorize the interaction. The authorizing entity computer 214 can determine wither or not to authorize the interaction as described in reference to FIG. 1.

After step 9, the authorizing entity computer 214 can perform steps 10-12 and other steps which are similar to steps 12-15 and other steps described with respect to FIG. 1 and will not be repeated here.

In other embodiments, the authorizing entity computer 214 can obtain an authentication result as to whether the user of the communication device 202 is authentic or not. It can then transmit the authentication result to the resource provider computer via the intermediary authentication computer 220, which could be a directory server. The resource provider computer 206 could then include the authentication result in an authorization request message with the virtual access credential as described above. When the authorizing entity computer receives the authorization request message, it recognizes the authentication result and can use this in making its authorization decision.

FIG. 3 shows a resolution process according to embodiments. The method illustrated in FIG. 3 will be described in the context of an authorizing entity computer initiating a resolution processes after performing the methods described in FIGS. 1-2 any suitable number of times. It is understood, however, that the invention can be applied to other circumstances (e.g., performed at the end of a day, etc.).

FIG. 3 includes a transport computer 308, a network processing computer 310, an authorizing entity computer 314, and a plurality of external entity computers including a first external entity computer 318A, a second external entity computer 318B, and a third external entity computer 318C. Although one transport computer 308 is illustrated in FIG. 3, it is understood that any suitable number of transport computers can participate in the resolution process. Further, the authorizing entity computer 314 can maintain a resolution account 314A in communication with the external entity computer.

The authorizing entity computer can begin performing a resolution process between the authorizing entity computer and a transport computer 308 associated with a resource provider. The resource provider may have previously performed an interaction with a user, for example, as described in FIG. 1 and/or FIG. 2.

At step 1, the authorizing entity computer 314 can request funds from the plurality of external entity computers. At step 2, after receiving the request for funds, the plurality of external entity computers can transfer funds to the resolution account 314A maintained by the authorizing entity computer 314 in communication with an external entity computer. At step 3, after receiving the funds from the plurality of external entity computers, the authorizing entity computer 314 can transfer funds equal to the transaction amount to the network processing computer 310.

FIG. 3 includes three external entity computers that may transfer funds to the resolution account 314A. The first, second, and third external entity computers 318A-318C may share a single resolution account 314A. For example, the first, second, and third external entity computers 318A-318C may correspond to an external entity with multiple locations (e.g., a building access entity that is associated with buildings in three different states). However, it is understood that each external entity computer can be associated with a resolution account. For example, the authorizing entity computer 314 can communicate with 10 external entity computers and can maintain 10 resolution accounts.

At step 4, the network processing computer 310 can transfer the appropriate funds to the transport computer 308. In some embodiments, the network processing computer 310 can transfer funds equal to the transaction amount to the transport computer 308. In other embodiments, the network processing computer 310 can transfer funds equal to the transaction amount less than an interchange fee and/or any other appropriate fees to the transport computer 308.

The network processing computer 310 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

Figure 4:
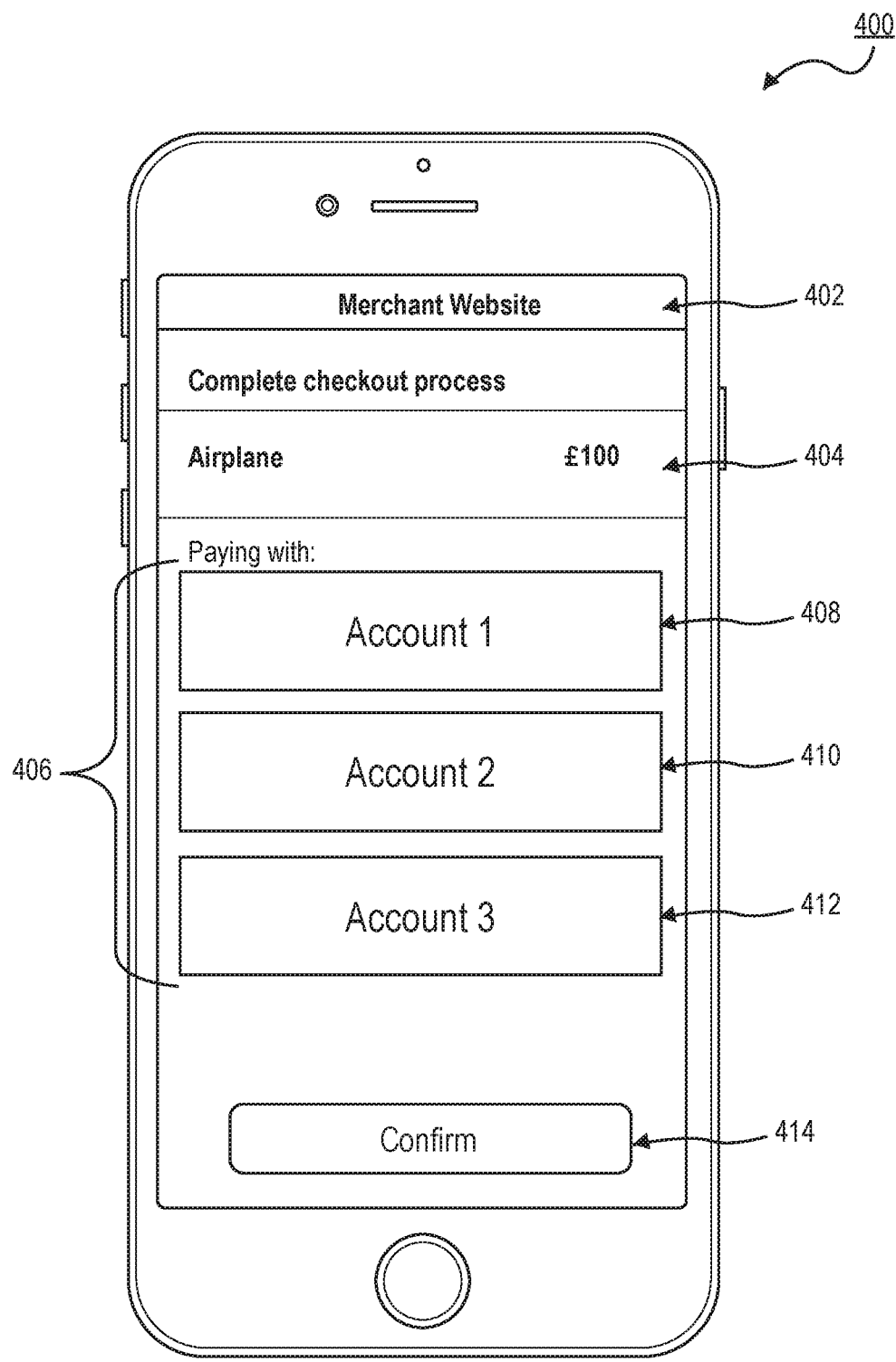
FIG. 4 shows a user interface of a communication device displaying an interaction selection screen according to embodiments.

FIG. 4 shows a user interface of a communication device displaying an interaction selection screen according to embodiments. A communication device (e.g., the communication device 102) can be configured to display the user interface 400. The user interface 400 can include a website indicator 402 (e.g., a name of the website, URL, etc.), an interaction amount 404, a plurality of account selection buttons 406 including a first button 408, a second button 410, and a third button 412, as well as a confirm button 414.

When initiating an interaction with a resource provider computer (e.g., at step 3 in FIG. 2), the communication device can display the interaction selection screen to the user. The website indicator 402 can provide the user with information regarding the resource provider website. For example, the website indicator 402 can be "Merchant Website."

In some embodiments, the interaction selection screen can include the interaction amount 404. For example, the user can be initiating an interaction to purchase an airline ticket for £100. The interaction amount 404 can allow the user to review the purchase amount.

The communication device can prompt the user to select an account with which to perform the interaction. For example, the communication device can display a plurality of account selection buttons 406 including three different accounts that the user can select. The user can select, for example, account 3 by touching or clicking the third button 412. After the user selects an account, the user may select the confirm button 414. The communication device can then send the virtual access credential associated with account 3 to the resource provider computer. The communication device can also transmit any other suitable interaction data (e.g., the amount, etc.), as known to one of skill in the art.

Figure 5:
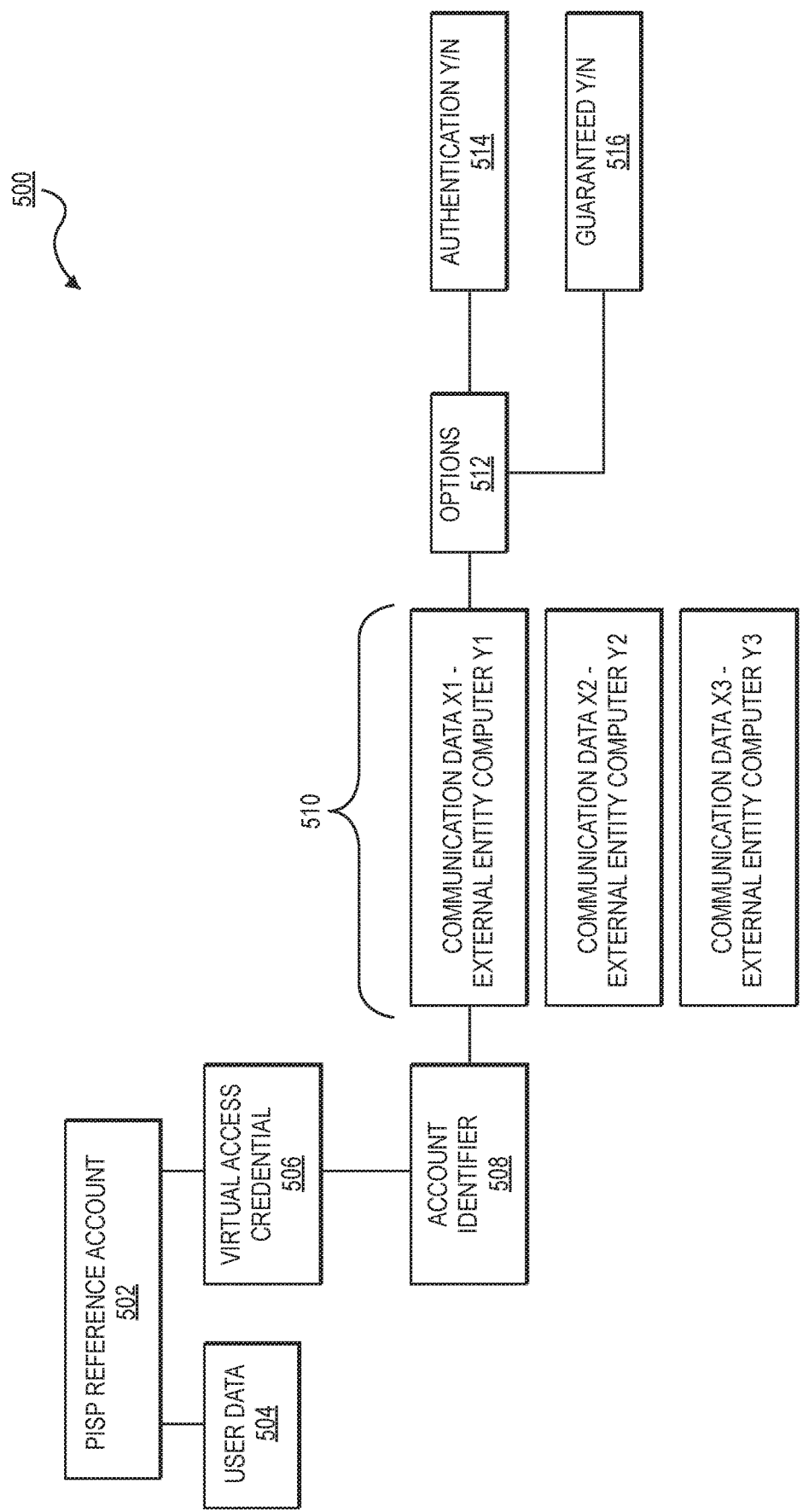
FIG. 5 shows a block diagram of a virtual access credential database according to embodiments.

FIG. 5 shows a block diagram of a virtual access credential database according to embodiments. The virtual access credential database 500 can illustrate the table shown in FIG. 1 in greater detail.

The virtual access credential database 500 can include user data 504. The user data 504 can include any suitable data related to the user. For example, the user data 504 can include a phone number, an address, a name of the user, a user device identifier, and/or any other information capable of identifying the user and/or the communication device 102.

The user data 504 can be linked to, in some embodiments, a payment initiation service provider (PISP) reference account 502. The PISP reference account 502 can be an account identifier indicating that the authorizing entity computer can initiate transactions on behalf of the user. The authorizing entity computer can receive a PISP reference account 502 from any suitable entity, such as an external entity. For example, a user can give consent for the authorizing entity computer to initiate transactions on behalf of the user and provide the authorizing entity computer with an account number associated with the external entity.

The PISP reference account 502 can be linked to a generated virtual access credential 506. The virtual access credential 506 can be generated as described herein when the authorizing entity computer receives the user data 504 and account identifier 508, as well as consent to initiate transactions on behalf of the user, from the user. The virtual access credential 506 can be linked to the account identifier 508 received from the user.

The account identifier 508 can be linked to communication data that allows the authorizing entity computer to communicate with an external entity computer. FIG. 5 shows a plurality of communication data 510 including three sets of communication data for different external entity computers. The account identifier 508 can, for example, be linked to communication data X1 associated with the external entity computer Y1.

The virtual access credential database 500 can further link the communication data X1 for the external entity computer Y1 with an options data field 512. The options data field can include any suitable options that may be set by the external entity computer. For example, the options data field 512 can be set by the external entity computer when the authorizing entity computer verifies the user's account identifier during user registration.

The options data field 512 can include an authentication Y/N 514 option. The authentication Y/N 514 option indicates to the authorizing entity computer whether or not to perform an authentication process to authenticate the user during an interaction. For example, if the authentication Y/N 514 option is set to Y (i.e., yes), then when the authorizing entity computer receives an authorization request message comprising a virtual access credential 506 associated with the account identifier 508, then the authorizing entity computer can initiate an authentication process. For example, the authorizing entity computer can generate an authentication request and transmit the authentication request to the communication device indicated by a phone number in the user data 504, as described herein.

The options data field 512 can further include a guaranteed Y/N 516 option. The guaranteed Y/N 516 option indicates to the authorizing entity computer whether or not the external entity computer has guaranteed interaction performed by the user associated with the account identifier 508. For example, in some embodiments, the external entity computer can guarantee transactions performed by the user. In this case, the authorizing entity computer can determine whether or not to authorize an interaction performed by the user without transmitting a confirmation request to the external entity computer to confirm that sufficient funds are in the user's value account.

In other embodiments, the external entity computer can guarantee access to a secure location. In this case, the authorizing entity computer can determine whether or not to authorize the user to access the secure location, if the virtual access credential is correct for the account identifier, without first sending a confirmation request to the external entity computer to confirm that the user can access the secure location.

Figure 6:
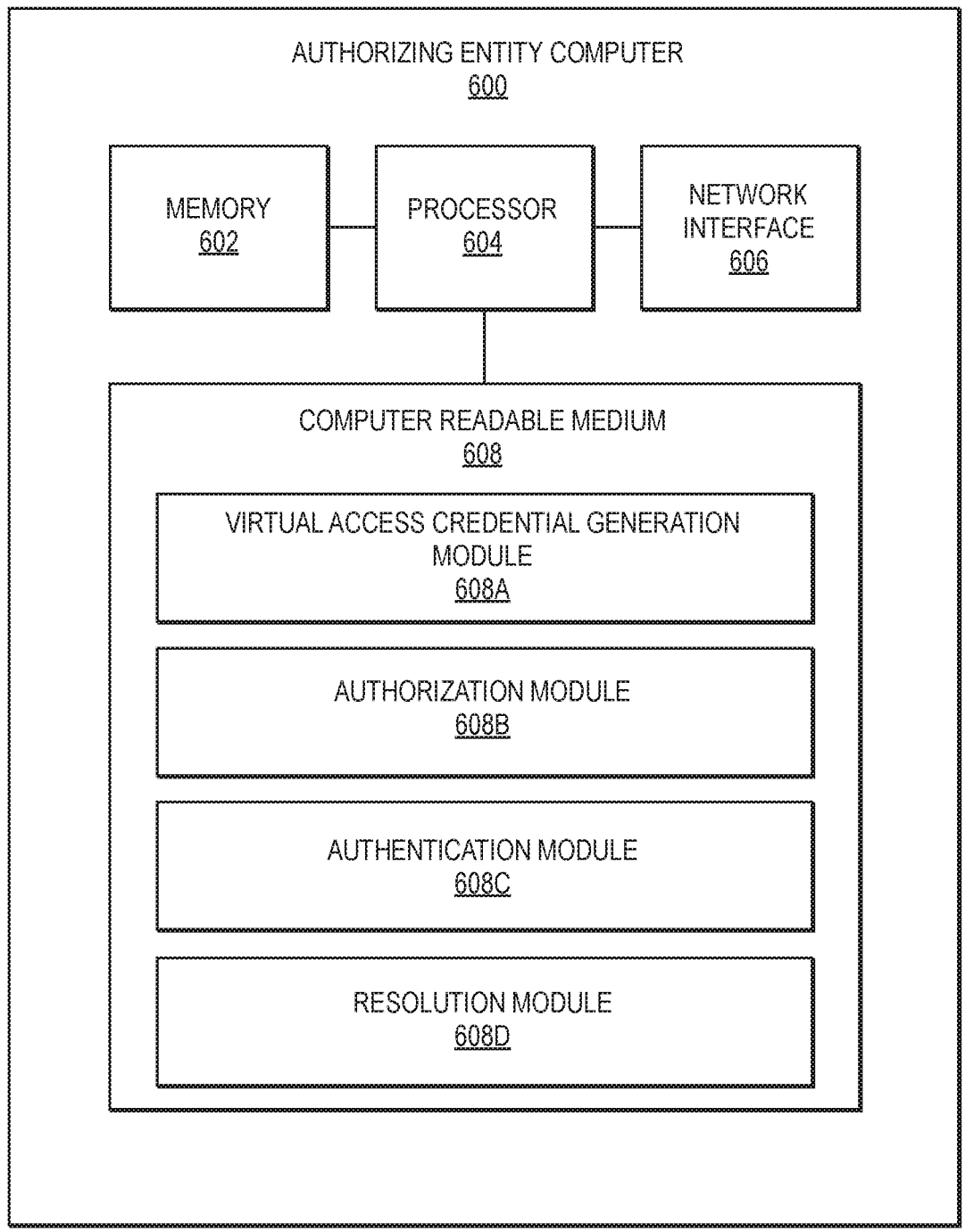
FIG. 6 shows a block diagram of an authorizing entity computer according to embodiments.

FIG. 6 shows a block diagram of an authorizing entity computer according to embodiments. The exemplary authorizing entity computer 600 may comprise a processor 604. The processor 604 may be coupled to a memory 602, a network interface 606, and a computer readable medium 608. The computer readable medium 608 can comprise a virtual access credential generation module 608A, an authorization module 608B, an authentication module 608C, and a resolution module 608D.

The memory 602 can be used to store data and code. The memory 602 may be coupled to the processor 604 internally or externally (e.g., cloud based data storage), and may comprise any combination of volatile and/or non-volatile memory, such as RAM, DRAM, ROM, flash, or any other suitable memory device. For example, the memory 602 can store virtual access credentials, account identifiers, user data, communication data, cryptographic keys, etc.

The computer readable medium 608 may comprise code, executable by the processor 604, for performing a method comprising: receiving, by an authorizing entity computer, a request for a virtual access credential from a communication device operated by a user; transmitting, by the authorizing entity computer, the virtual access credential to the communication device operated by the user; receiving, by the authorizing entity computer, an authorization request message comprising the virtual access credential from an access device associated with a resource provider for an interaction between the user and the resource provider; determining, by the authorizing entity computer, an account identifier linked to the virtual access credential, the account identifier being associated with an account maintained by an external entity computer that is external to the authorizing entity computer; determining, by the authorizing entity computer, that the interaction is authorized based upon determining the account identifier associated with the virtual access credential; generating, by the authorizing entity computer, an authorization response message; and transmitting, by the authorizing entity computer, the authorization response message to the access device.

The virtual access credential generation module 608A may comprise code or software, executable by the processor 604, for generating virtual access credentials. The virtual access credential generation module 608A, in conjunction with the processor 604, can generate a virtual access credential associated with an account identifier received from a communication device.

In some embodiments, the virtual access credential generation module 608A, in conjunction with the processor 604, can generate the virtual access credential based on the account identifier. For example, the virtual access credential generation module 608A, in conjunction with the processor 604, can hash the account identifier to determine the virtual access credential. A hash function can be used to hash the account identifier. The hash function can be any suitable hash function, for example, MD5, HMAC-MD5, SHA1, SHA256, SHA512, and/or the like. For example, the virtual access credential generation module 608A, in conjunction with the processor 604, can hash an account identifier (e.g., a 16 digit PAN) of "1234567890123456" with SHA256 to determine the virtual access credential of "7A51D064A1A216A692F753FCDAB276E4FF201 A01D8B66F56D50D4D719FD0D C87." In some embodiments, the output of the hash function can be truncated to a shorter length (e.g., 5, 10, 15, etc. digits).

In other embodiments, the virtual access credential generation module 608A, in conjunction with the processor 604, can generate the virtual access credential determining a value of the next virtual access credential. For example, the first virtual access credential can have a value of "4123451," the second virtual access credential can be "4123452," the third virtual access credential can be "4123453," etc. The virtual access credential generation module 608A, in conjunction with the processor 604 can determine the next virtual access credential using any suitable pattern (e.g., incrementing by 1, 2, 10, 500, 899, etc.) or unpredictable pattern (e.g., incrementing by a random value).

The authorization module 608B may comprise code or software, executable by the processor 604, for authorizing an interaction. The authorization module 608B, in conjunction with the processor 604, can perform some or all the functionality associated with authorizing an interaction associated with an authorization request message, as described in further detail herein. The authorization request message may include any suitable information that may be used to authorize or identify the interaction, and may be generated by the resource provider computer or the access device in response to an interaction between the user and the resource provider. The authorization module 608B may, for instance, in conjunction with the processor 604, compare the information received by via the authorization request message with stored information in a database (such as comparing verification values). In some embodiments, if the received and stored values match, the authorization module 608B, in conjunction with the processor 604, can authorize the interaction (or may be more likely to authorize the interaction) and may instruct the authorizing entity computer 600 to generate an authorization response message. The authorization module 608B, in conjunction with the processor 604, can execute any further operations associated with authorization.

The authentication module 608C may comprise code or software, executable by the processor 604, for authenticating a user and/or a communication device. The authentication module 608C, in conjunction with the processor 604, can determine whether or not a user and/or a communication device is authentic. For example, the authentication module 608C, in conjunction with the processor 604, can generate authentication request messages including a request for authentication data (e.g., password, biometric template, etc.). The authentication module 608C, in conjunction with the processor 604, can verify whether or not received authentication data (received in an authentication response message) matches expected authentication data.

For example, the authentication module 608C, in conjunction with the processor 604, can generate an authentication request message requesting a password from the user. The authorizing entity computer 600 can transmit the authentication request message to the user's communication device. The user can input the password into the communication device which can then send an authentication response message including the password to the authorizing entity computer 600. The authentication module 608C, in conjunction with the processor 604, can then determine whether or not the received password matches an expected password. For example, the authentication module 608C, in conjunction with the processor 604, can compare the received password, which may be encrypted, to a stored password, which may also be encrypted. For example, each password may be hashed and salted, as known to one of skill in the art. The authentication module 608C, in conjunction with the processor 604, can determine whether or not the two passwords match. If the passwords match, then the authentication module 608C, in conjunction with the processor 604, can determine that the user is authenticated. If the passwords do not match, then the authentication module 608C, in conjunction with the processor 604, can determine that the user is not authenticated. In some embodiments, the authentication module 608C, in conjunction with the processor 604, can indicate to the authorization module 608B whether or not the user is authenticated.

The resolution module 608D may comprise code or software, executable by the processor 604, for performing a resolution process. In some embodiments, a resolution process can include a clearance process and a settlement process. A resolution process may be performed to reconcile accounts between transacting entities such as the authorizing entity computer 600, a network computer, and a transport computer/resource provider computer. The settlement process may be performed following the clearance process. The authorizing entity computer 600 can determine financial compensations between the authorizing entity computer 600 using a resolution account maintained in communication with external entity computer(s) and acquirers. After all the transaction amounts are determined, during a clearance process, a total can be determined that reflects the amount to be debited from the resolution account. The authorizing entity computer 600 can repeat this process for each external entity computer that is associated with performed interactions. The amount can be credited to the acquirer's account, which in some embodiments, may be maintained by the authorizing entity computer 600 or maintained by the transport computer. The authorizing entity computer 600 can notify the transport computer about the crediting of the account.

The network interface 606 may include an interface that can allow the authorizing entity computer 600 to communicate with external computers. The network interface 606 may enable the authorizing entity computer 600 to communicate data to and from another device (e.g., communication devices, external entity computers, network processing computers, etc.). Some examples of the network interface 606 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 606 may include Wi-Fi™. Data transferred via the network interface 606 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 606 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Embodiments have a number of advantages. For example, by generating a virtual access credential for an account identifier, the communication device does not need to provide the account identifier (encrypted or otherwise) to the resource provider computer. Instead, the communication device provides the virtual access credential to the resource provider computer, thus improving the security of the account identifier from potentially malicious resource provider computers.

Embodiments have a number of additional advantages. For example, currently, access devices may only accept account identifiers corresponding to particular types of accounts (e.g., savings account, checking account, etc.). Embodiments of the invention allow for access devices to accept virtual access credentials, linked to account identifiers, from a large range of accounts and possibly not gain information into what type of account the user is interacting with. For example, the user may be interacting with a brokerage account at an access device at a supermarket. The access device can accept the virtual access credential regardless of the account. This is beneficial since the user has increased flexibility regarding which accounts they can choose to perform interactions with.

Embodiments of the invention further allow for a user to opt to spend funds from a brokerage account in real-time during a transaction, rather than accessing their brokerage account, initiating a sale of securities, waiting 1-3 days for a confirmation of the sale of the securities, transferring the acquired funds from the sale to an account linked to their debit card, and then reinitiating the transaction with the resource provider if the resource is not sold out or has otherwise become unavailable. The authorizing entity computer can authorize the transaction using the virtual access credential associated with the brokerage account, and can later perform a resolution process with the external entity computer maintaining the brokerage account. This is beneficial as the user does not need to perform as many steps or wait as long to perform transactions with funds from brokerage accounts.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by an authorizing entity computer, a request for a virtual access credential from a communication device operated by a user, the request including user data;
generating, by the authorizing entity computer, the virtual access credential based at least in part on the user data;
transmitting, by the authorizing entity computer, the virtual access credential to the communication device operated by the user, wherein the virtual access credential is tokenized into an access token by a token service;

receiving, by a processing computer communicatively coupled to the authorizing entity computer, an authorization request message comprising the access token for an interaction between the user and a resource provider, wherein the processing computer is associated with the token service;

de-tokenizing, by the processing computer, the access token to obtain the virtual access credential, wherein the processing computer is not configured to process the virtual access credential;

modifying, by the processing computer, the authorization request message to replace the access token with the virtual access credential;

transmitting, by the processing computer, the authorization request message to the authorizing entity computer;

receiving, by the authorizing entity computer, the authorization request message comprising the virtual access credential from the processing computer;

determining, by the authorizing entity computer, an account identifier linked to the virtual access credential and communication data associated with the account identifier, the communication data including a message type for formatting a confirmation request message for an external entity computer, the account identifier being associated with an account maintained by the external entity computer without being linked to the processing computer, the external entity computer being external to the authorizing entity computer and the processing computer;

formatting, by the authorizing entity computer, the confirmation request message based on the communication data including the message type, by mapping data elements in data fields in the authorization request message to data elements in data fields in the confirmation request message, the confirmation request message including the account identifier;

transmitting, by the authorizing entity computer and to the external entity computer, the formatted confirmation request message;

receiving, by the authorizing entity computer and from the external entity computer, a confirmation response message that confirms the data of the interaction;

determining, by the authorizing entity computer, that the interaction is authorized based upon determining the account identifier associated with the virtual access credential and the confirmation response message;

generating, by the authorizing entity computer, an authorization response message;

transmitting, by the authorizing entity computer, the authorization response message to the processing computer; and initiating, by the authorizing entity computer, a resolution process with the resource provider through the processing computer, wherein the resolution process includes a settlement process that transfers funds between the authorizing entity computer, the external entity computer, and the processing computer.

2. The method of claim 1, wherein the account is a value account.

3. The method of claim 1 further comprising:
storing, by the authorizing entity computer, a table comprising a plurality of virtual access credentials linked to a plurality of different account identifiers, wherein the virtual access credential and the account identifier are in the table.

4. The method of claim 3, wherein the table further comprises a plurality of user identifiers, each user identifier being linked to one or more virtual credential and account identifier pairs.

5. The method of claim 4, wherein the table further comprises the communication data for communicating with external entities.

6. The method of claim 1 further comprising:
formatting, by the authorizing entity computer, the confirmation request message based upon second data in the authorization request message and using the account identifier.

7. The method of claim 6, wherein the formatting, transmitting, and receiving, are performed before generating the authorization response message and after receiving the authorization request message.

8. The method of claim 1 further comprising, after receiving the authorization request message:
transmitting, by the authorizing entity computer, an authentication request message to the communication device; and
receiving, by the authorizing entity computer, an authentication response message.

9. The method of claim 8, wherein the authentication request message further comprises a request to use the account identifier and the authentication response message further comprises a response to use the account identifier.

10. The method of claim 1 further comprising:
performing a resolution process between the authorizing entity computer and a transport computer associated with the resource provider.

11. The method of claim 10, wherein the authorizing entity computer maintains a resolution account in communication with the external entity computer.

12. The method of claim 1, wherein the authorization request message is in an ISO 8583 format and contains a transaction amount, and the confirmation request message is in an ISO 20022 format and contains the transaction amount.

13. The method of claim 12, wherein the authorizing entity computer maintains a resolution account in communication with the external entity computer, and wherein the authorizing entity computer receives funds from the external entity computer and other external entities in the resolution account, and wherein the authorizing entity computer transfers the transaction amount to the processing computer.

14. A system comprising:
an access device; and
an authorizing entity computer in communication with the access device, the authorizing entity computer comprising a processor, a memory device, and a computer-readable medium coupled to the processor, the computer-readable medium comprising code executable by the processor for implementing a method comprising:
receiving a request for a virtual access credential from a communication device operated by a user, the request including user data;
generating the virtual access credential based at least in part on the user data;
transmitting the virtual access credential to the communication device operated by the user, wherein the virtual access credential is tokenized into an access token by a token service;
a processing computer communicatively coupled to the authorizing entity computer, the processing computer comprising a processor, a memory device, and a computer-readable medium coupled to the processor, the computer-readable medium comprising code executable by the processor to:

receive an authorization request message comprising the access token for an interaction between the user and a resource provider, wherein the processing computer is associated with the token service;

de-tokenize the access token to obtain the virtual access credential, wherein the processing computer is not configured to process the virtual access credential;

modify the authorization request message to replace the access token with the virtual access credential;

transmit the authorization request message to the authorizing entity computer;

wherein the code executable by the processor of the authorizing entity computer implements the method further comprising:

receiving the authorization request message comprising the virtual access credential from the processing computer;

determining an account identifier linked to the virtual access credential and communication data associated with the account identifier, the communication data including a message type for formatting a confirmation request message for an external entity computer, the account identifier being associated with an account maintained by the external entity computer without being linked to the processing computer, the external entity computer being external to the authorizing entity computer and the processing computer;

formatting the confirmation request message based on the communication data including the message type, by mapping data elements in data fields in the authorization request message to data elements in data fields in the confirmation request message, the confirmation request message including the account identifier;

transmitting, to the external entity computer, the formatted confirmation request message;

receiving, from the external entity computer, a confirmation response message that confirms the data of the interaction;

determining that the interaction is authorized based upon determining the account identifier associated with the virtual access credential and the confirmation response message;

generating an authorization response message;

transmitting the authorization response message to the processing computer; and initiating a resolution process with the resource provider through the processing computer, wherein the resolution process includes a settlement process that transfers funds between the authorizing entity computer, the external entity computer, and the processing computer.

15. The system of claim 14, wherein the account is a value account.

16. The system of claim 14, wherein the method further comprises:

storing, by the authorizing entity computer a table comprising a plurality of virtual access credentials linked to a plurality of different account identifiers, wherein the virtual access credential and the account identifier are in the table.

17. The system of claim 16, wherein the table further comprises a plurality of user identifiers, each user identifier being linked to one or more virtual credential and account identifier pairs.

18. The system of claim 17, wherein the table further comprises the communication data for communicating with external entities.

19. The system of claim 14, wherein the method further comprises:

formatting, the confirmation request message based upon second data in the authorization request message and using the account identifier.

20. The system of claim 19, wherein the formatting, transmitting, and receiving, are performed before generating the authorization response message and after receiving the authorization request message.

* * * * *